Dec. 8, 1970 C. S. GEHRIE ET AL 3,545,238

COMBINATION LOCKS

Filed Feb. 10, 1969 8 Sheets-Sheet 1

INVENTORS
CHARLES S. GEHRIE AND
IRVING FEINBERG

BY Harry G. Shapiro

ATTORNEY

COMBINATION LOCKS

Filed Feb. 10, 1969 8 Sheets-Sheet 2

INVENTORS
CHARLES S. GEHRIE AND
IRVING FEINBERG
BY Harry S. Shapiro
ATTORNEY

COMBINATION LOCKS

Filed Feb. 10, 1969 8 Sheets-Sheet 3

INVENTORS
CHARLES S. GEHRIE AND
IRVING FEINBERG
BY
Harry G. Shapiro
ATTORNEY

INVENTORS
CHARLES S. GEHRIE AND
IRVING FEINBERG
BY Harry G. Shapiro
ATTORNEY

INVENTORS
CHARLES S. GEHRIE AND
IRVING FEINBERG
BY Harry G. Shapiro
ATTORNEY

COMBINATION LOCKS

Filed Feb. 10, 1969

INVENTORS
CHARLES S. GEHRIE AND
IRVING FEINBERG
BY Harry S. Shapiro
ATTORNEY

INVENTORS
CHARLES S. GEHRIE AND
IRVING FEINBERG
BY Harry S. Shapiro
ATTORNEY

COMBINATION LOCKS

Filed Feb. 10, 1969 8 Sheets-Sheet 8

INVENTORS
CHARLES S. GEHRIE AND
IRVING FEINBERG
BY Harry G. Shapiro
ATTORNEY 3,545,238
COMBINATION LOCKS Charles S. Gehrie, Montclair, and Irving Feinberg, Saddle Brook, N.J., assignors, by mesne assignments, to Presto Lock Co., Inc., Garfield, N.J., a corporation of Delaware Filed Feb. 10, 1969, Ser. No. 797,894
Int. Cl. E05b 37/02, 65/50, 65/52
U.S. Cl. 70—312 22 Claims

ABSTRACT OF THE DISCLOSURE

A combination lock for a latching device of the pivoted or lift-up type which employs a plug member carried by a rotatably mounted latch member. The plug member is mounted for linear movement with respect to the rotatable latch member. The plug member is constructed to cooperate with sleeve means for the respective dials to lock the latch member in its latched position, or selectively, to permit the latch member to be rotated to unlatch position depending upon the orientation of the sleeve means with respect to the plug member. The sleeve means are provided with radial slots which allow or prevent movement of the plug member depending upon whether means provided by the plug member and the radial slots are in alignment ("on combination") or out of alignment ("off combination"). Cooperable means are provided by the plug member and a plate member, which is adapted to connect the device to a support, for imparting movement to the plug member responsive to the rotation of the pivoted latch member, rotation being permitted only when the device is "on combination."

The invention relates to improvements in the art of latching devices provided with keyless or combination locking means, and is more particularly directed to improvements in the application of combination locking means to latching devices of the type wherein a latch member or latch assembly is pivotally related to a bottom plate member adapted to be connected in fixed relation to a support.

BACKGROUND OF THE INVENTION

Combination locking mechanisms are employed for latching devices of the type wherein a latch member or the like is mounted for sliding movement. In latching devices of this type which employ a plurality of dials and respective sleeve means associated with each dial, the sleeves are each provided with a flange or projection and a flat portion. When all the sleeves are oriented so that their flat portions are in alignment toward the slidable member ("on combination"), the member may by-pass the sleeves for manual movement of the member to unlatched position. When a sleeve is oriented so that a flange is in the path of movement of the slidable member, the device is in locked condition ("off combination"). Combination locking mechanisms employing sleeve means of the flange and flat portion type have not been used for latching devices of the type which employ a pivoted or lift-up latch member.

SUMMARY OF THE INVENTION

In accordance with the invention, combination locking means is incorporated in a latching device of the type wherein the latch member or latch assembly is pivotally related to a member adapted to be connected in fixed relation to a support. The latch assembly comprises means cooperable with a hasp, a latch member and a plug member. The latch member is provided with a plurality of aligned, spaced openings. A shaft is mounted on the underside of the pivotally mounted latch member for movement therewith. A dial is positioned to partially extend through each opening in the latch member, and respective sleeve means is associated with each dial. The sleeve means are mounted on the shaft and each sleeve means is provided with a radial slot. The plug member is positioned beneath the latch member and is mounted for movement in a plane perpendicular to the longitudinal axis of the shaft. The plug member is formed to provide a plurality of spaced fingers each adapted to be received in the respective radial slots of the sleeve means when the fingers and slots are in alignment. The circumferential area of each sleeve means, other than at the slotted area, furnishes a solid diameter to the fingers of the plug member acting to block the movement of the plug member when the fingers and slots are out of alignment.

The plug member is provided with means cooperable with means provided by the bottom plate member for imparting movement to the plug member upon rotation of the latch assembly, the rotation being permitted when the fingers of the plug member are in alignment with the slots in the sleeve means ("on combination"). When the fingers of the plug member are out of alignment with the radial slots of the sleeve means ("off combination"), the movement of the plug member is blocked and the latching assembly is locked against the bottom plate member.

In the preferred form of the invention, the sleeve means are in the form of sleeves separate from the dials. The sleeves and dials are made with cooperable means for releasably keying them together to permit the selection of a combination of one's own secret choice.

The latching device and combination locking means associated therewith (hereinafter referred to as a combination lock) is of a construction whereby in the unlatched position of the latch assembly, the dials are secured against rotation. As a result, a serious problem encountered in connection with combination locks is overcome. It has been found that prospective customers of equipment provided with combination locks, for example luggage or other containers or receptacles, are tempted to manipulate the locks before becoming familiar with the written instructions which accompany the locks. As a result of the tampering, the "on combination" is lost. The articles with the locks thereon must be returned to the manufacturer. In addition to shipping charges, the manufacturer must bear the expense of trying to salvage the locks, if possible. By preventing the rotation of the dials in the unlatched condition of the lock, this problem is substantially overcome.

Another advantage afforded by the combination lock of the invention is that in the preferred construction thereof, which enables the user to select a combination of his own secret choice, the means for changing the combination is located where it is readily accessible. In prior art devices, the means for changing the combination is located on the inside of the receptacle or container where the changing means or shift lever has to be manipulated almost by feel. In accordance with the invention, the means for changing the combination is located on the underside of the latch assembly, thereby permitting access thereto on the outside of the luggage case, container or receptacle.

Other advantages and improved results furnished by the combination locks of the invention will be apparent from the following detailed description of several illustrated and preferred embodiments of the invention.

DESCRIPTION OF PREFERRED EMBODIMENTS

FIGS. 1–12 illustrate the combination locking mechanism of the invention as applied to a side catch-type of pivoted or lift-up latching device as generally shown in Levine Pat. No. 2,565,862, Aug. 28, 1951. Although the combination locking means of the invention may be used in conjunction with a device in which the latch member is pivoted to rotate about a separate, transverse pin as in the aforesaid Levine patent, the device may be constructed so that the latch member is pivotally related to a bottom plate member without a separate pivot pin, as illustrated.

Figure 1:
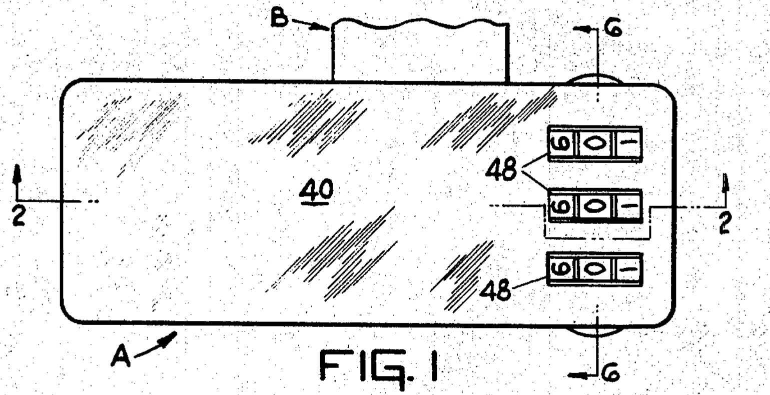
FIG. 1 is a top plan view of a combination lock and an associated hasp in accordance with one embodiment of the invention.
Figures 2, 3:
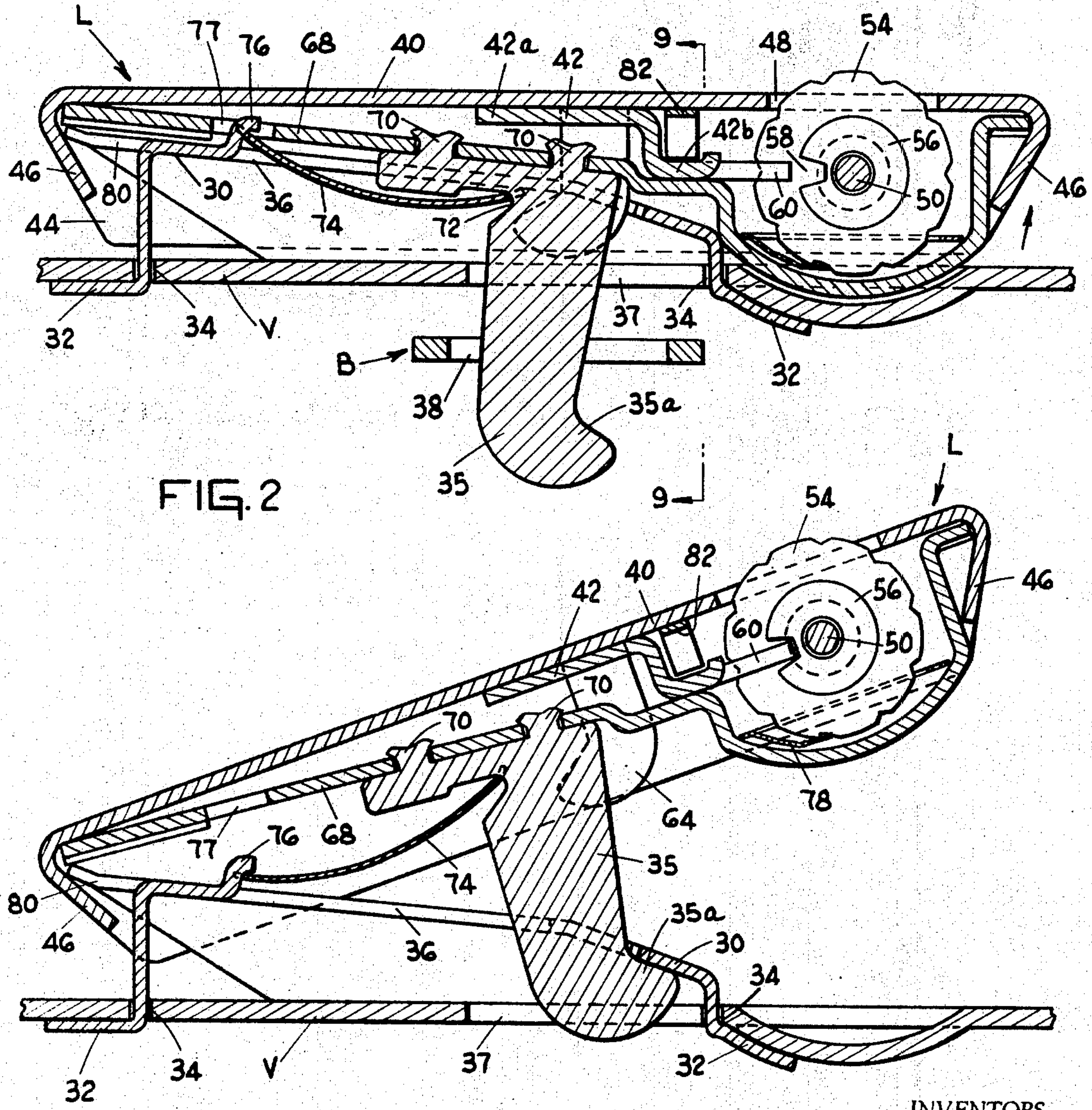
FIG. 2 is a vertical cross-sectional view taken approximately in the plane of line 2—2 of FIG. 1, this view showing the lock in "on combination" preliminary to the disengagement of the latching assembly from the hasp, this view further showing the lock connected to a support.
FIG. 3 is a view similar to FIG. 2 showing the latching assembly rotated to unlatched position or disengaged from the hasp.
Figure 4:
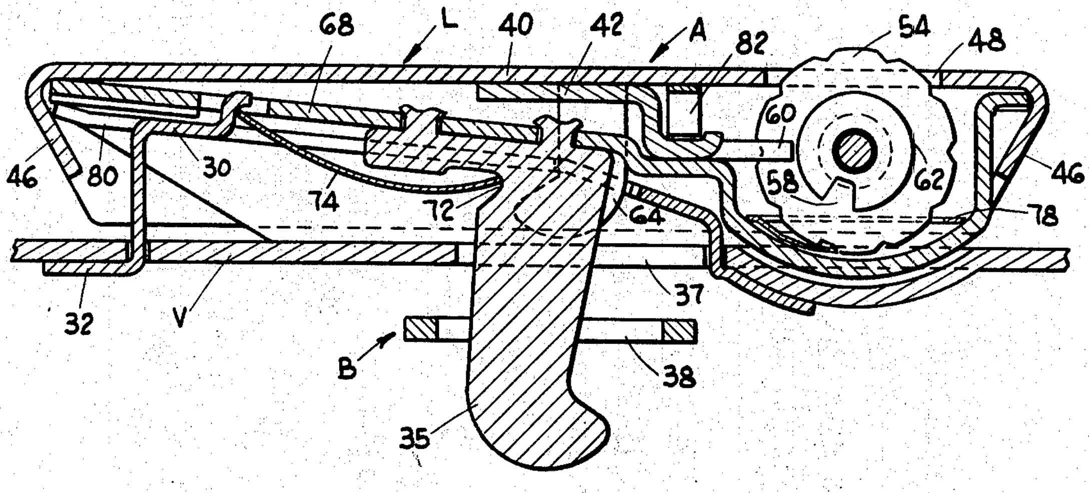
FIG. 4 is a view similar to FIG. 2 but showing the lock on "off combination" or in the locked condition of the device.

As shown in FIGS. 1–12, the combination lock A is cooperable with a hasp B and comprises a bottom plate member 30 having means 32 for the connection of the plate member in fixed relation to a support. Where the combination lock is used for a luggage case, the support may constitute a valance member V secured to the peripheral edge of a shell S, the valance member being cooperable with a second valance member V′ secured to the peripheral edge of an opposed case section or shell S′, shown in FIGS. 6 and 9. With the combination lock A connected to the shell S or the valance member V therefor, the hasp B is connected to the opposed case section of shell S′ and is extended through an opening in the valance member for cooperation with means projectable by the combination lock A through the opening. The bottom plate member 30 may be secured to the valance member V by connecting means 32 which, as shown in FIGS. 2, 3 and 4, are in the form of integral, longitudinally spaced tangs extended through longitudinally spaced openings 34 in the valance member V and bent over or clenched against the underside of the valance member. Any suitable means may be used to connect the bottom plate member in fixed relation to a support for the lock A.

A latch assembly L is pivotally related to the bottom plate member 30. The latch assembly comprises hasp-cooperable means 35 adapted to be extended through an opening 36 in the plate member, an opening 37 in the valance member V, and an opening 38 in the hasp B. The latch assembly also includes a latch member 40 and a plug member 42. In the form of the invention illustrated, the latch member is a substantially rectangularly shaped hollow casing open toward the underside and includes side walls 44 extending downwardly from each side of the face plate portion. The latch member may be of any desired contour or outline. The latch member has inturned end walls 46 which, as shown in FIGS. 2, 3 and 4, are bent inwardly to the extent of providing an acute angle with respect to the plane of the face plate portion. The purpose of such an angle will be subsequently described.

Figure 6:
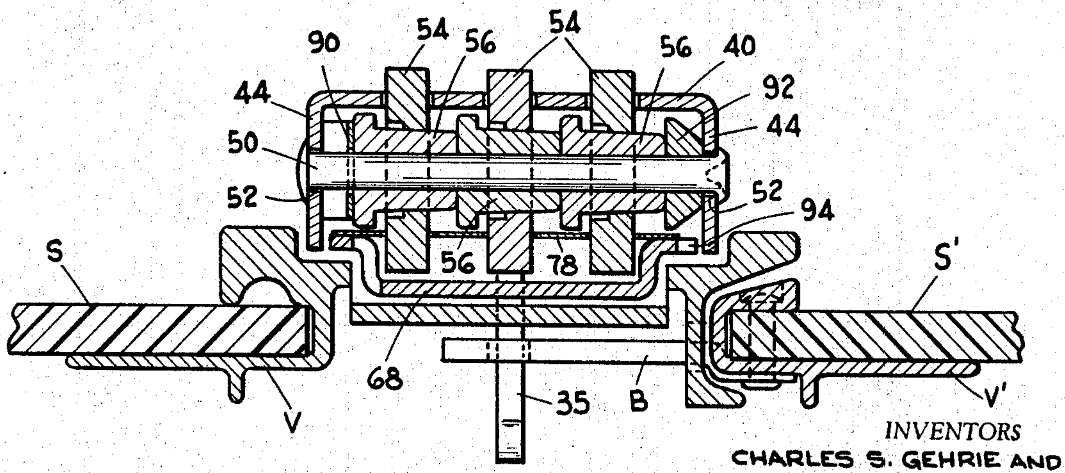
FIG. 6 is a vertical cross-sectional view taken approximately in the plane of line 6—6 of FIG. 1.
Figures 10, 11, 11A, 12:
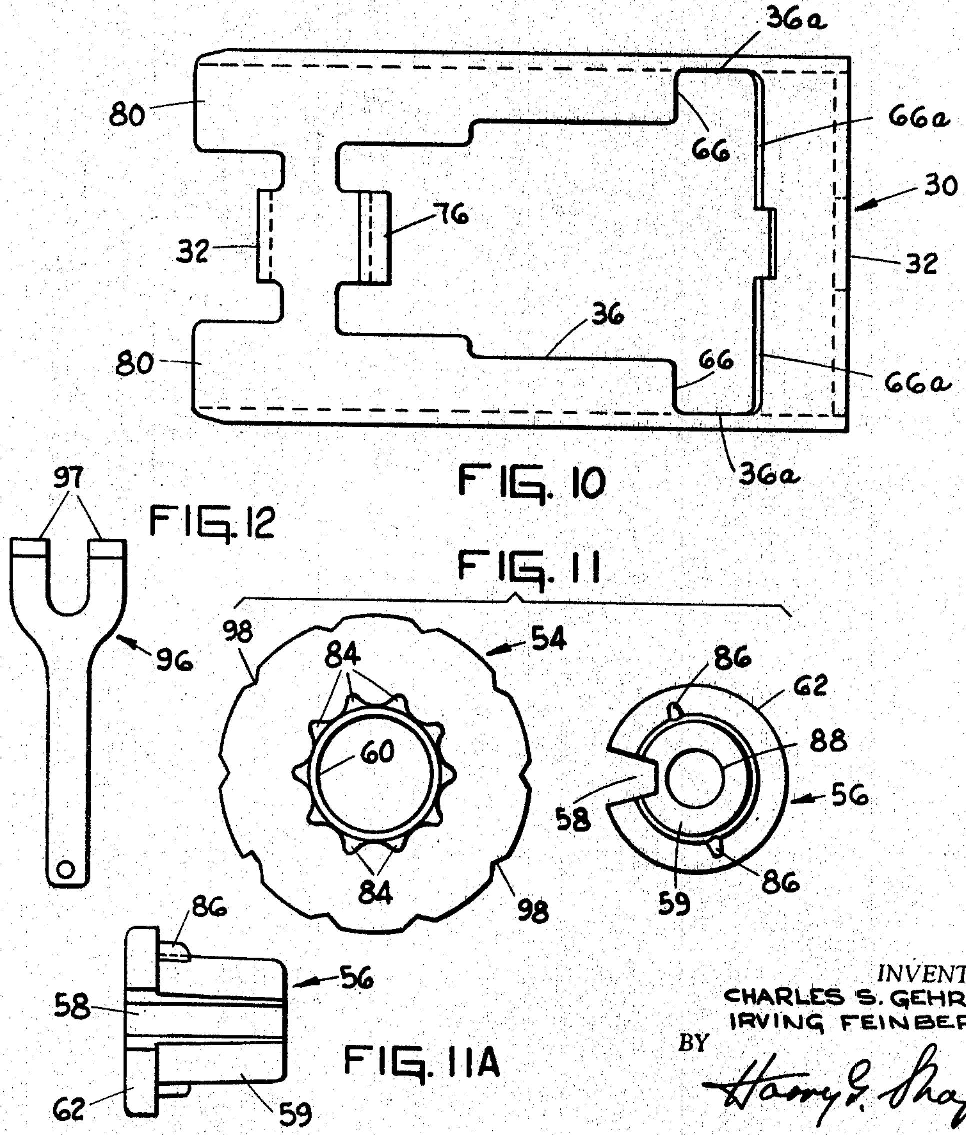
FIG. 10 is a top plan view of the bottom plate member to which the latching assembly is pivotally connected.
FIG. 11 shows a dial with an associated sleeve.
FIG. 11A is a side elevational view of a sleeve.
FIG. 12 is a top plan view of a device suitable for use to change the combination of the lock.
Figure 13:
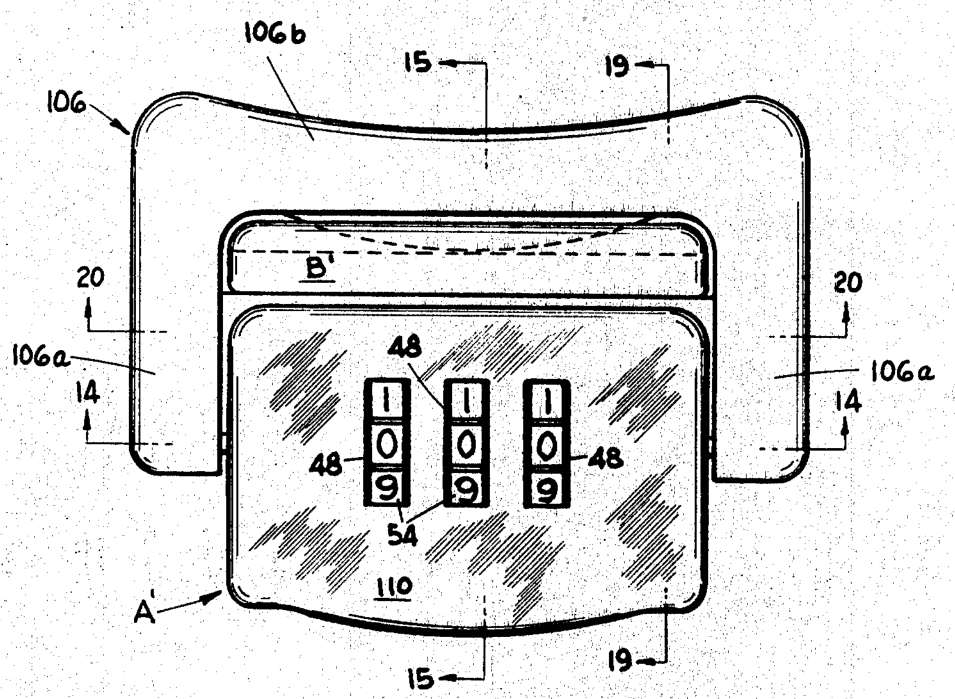
FIG. 13 is a top plan view of the combination locking mechanism of the invention as applied to a draw bolt type of latching device.

The latch member 40 is provided with a plurality of aligned spaced openings 48. A shaft 50 is positioned on the underside of the latch member and mounted for movement therewith. As shown in FIG. 6, the shaft may be in the form of a headed pin extended through aligned openings 52 in the transversely spaced side walls 44 with the end of the pin headed or peened over to complete the connection of the shaft with the latch member after the dials sleeve means and related parts have been assembled upon the shaft. A dial 54 is positioned to partially extend through each opening 48 in the latch member. Respective sleeve means 56 associated with each dial 54 are mounted on the shaft 50. The sleeve means in the illustrated preferred form of the invention are separate sleeves made to be releasably keyed to the dials. As will be subsequently explained, the sleeve means may be made as an integral part of each dial. The sleeve 56 for each dial is provided with a radial slot 58. As shown in FIGS. 11 and 11A, the slot preferably extends the entire length of the sleeve and is of substantial depth with reference to the sleeve's largest radial dimension. Each sleeve has a shank portion 59 of reduced diameter to allow such portion to be extended through the central bore 61 of each dial.

Figure 7:
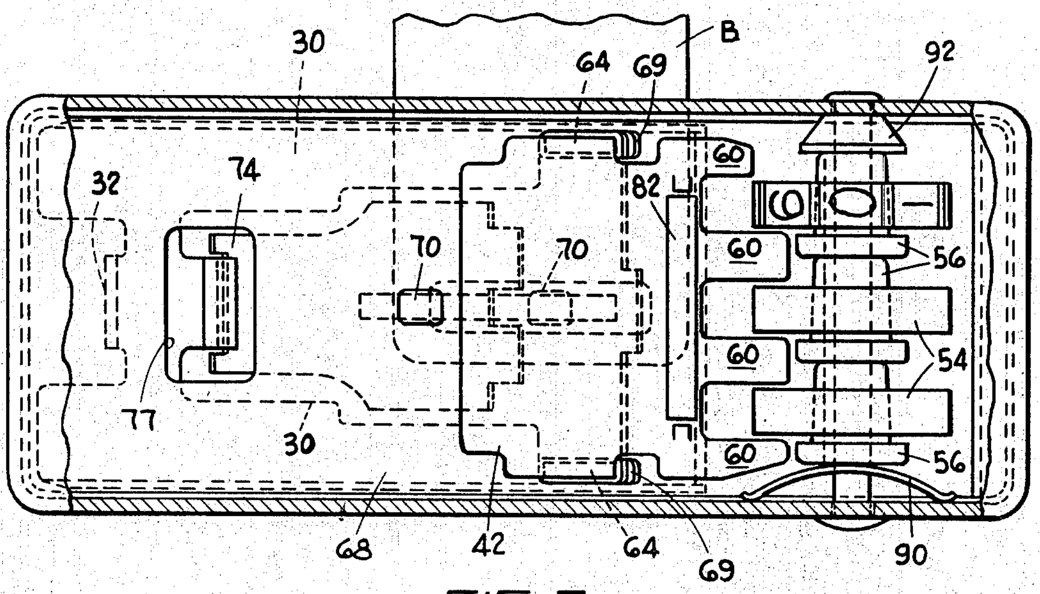
FIG. 7 is a top plan view of the combination lock, the latch member being broken away to show the relationship of the elements of the latch assembly when the lock is in "off combination"
Figure 8:
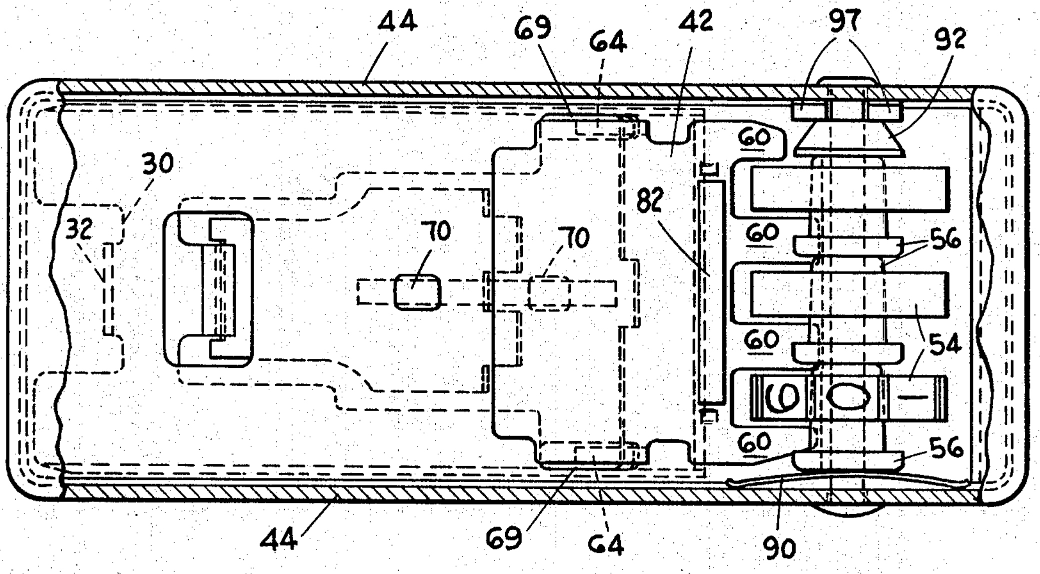
FIG. 8 is a view similar to FIG. 7, this view showing the lock "on combination," this view also showing the coaction of the parts when the combination is being changed.

The plug member 42 is positioned beneath the latch member 40 and mounted for linear movement in a plane perpendicular to the longitudinal axis of the shaft 50. As shown in FIGS. 7 and 8, the plug member is formed to provide a plurality of spaced fingers 60. The fingers are adapted to be received in the respective radial slots 58 of the sleeves when the fingers and slots are in alignment, as shown in FIGS. 2 and 3. The circumferential surface 62 of each sleeve at the area other than the slotted area presents a solid diameter to the fingers of the plug member and acts to block the movement of the plug member when the fingers and slots are out of alignment as shown in FIG. 4.

The plug member 42 is provided with means 64 cooperable with means 66 provided by the plate member 30 for automatically imparting linear movement to the plug member in response to rotation of the latch assembly L, rotation being permitted only when the fingers 60 of the plug member are in alignment with the radial slots 58 of the sleeves, or when the device is "on combination" as shown in FIGS. 2 and 3. When the fingers of the plug member are out of alignment with the radial slots or "off combination" as shown in FIG. 4, the latch assembly is locked against the bottom plate member 30.

In greater detail, the latch assembly L includes a frame member 68 which serves a number of functions. The means 35 cooperable with the hasp B is connected to the frame member and for this purpose, and as shown in FIGS. 2–4, the frame member is provided with a pair of longitudinally spaced openings through which stud portions 70 of the hasp-cooperable means are extended and headed over for the connection of the parts. The hasp-cooperable means thus secured to the frame member is provided with a recess 72 within which the end of a latch leaf spring 74 is received for bearing engagement against the part. The opposite end of the compressed spring bears against a projection 76 struck up from the bottom plate member 30 as shown in FIGS. 2, 3, 4, 7 and 8. An opening 77 in the frame member provides clearance for the projection. The spring acts to snap the latch assembly L (latch member 40, the hasp-cooperable means 35, the plug member 42, the shaft 50 and its associated dials and sleeves 54, 56, etc.) to the unlatched position of FIG. 3 when the latch assembly is manually raised, and to the down position of the assembly as shown in FIG. 2.

The frame member 68 is formed to enclose the shaft, dials and sleeves on the underside thereof, and further, provides a support for a dial-cooperable spring 78. As shown in FIGS. 2, 3 and 4, the frame member is secured to the latch member at the combination locking means end of the device by the inturned end wall 46 the acute angle of which provides a suitable surface for engagement by a finger of the user. Also, the valance V is provided with a depression to accommodate the increased thickness at this end of the lock.

The latch assembly L comprising the described components is pivotally related to the bottom plate member 30 by the action of the compressed spring 74. As previously indicated, one end of the spring bears against the projection 76 provided by the bottom plate member. The bottom plate member (FIG. 10) has a pair of transversely spaced extensions 80 which are held within the crotch provided by the inturned end wall 46 of the latch member 40; the extensions cannot escape because of the acutely angled end wall 46 as shown on the left side of the assembly as viewed in FIGS. 2, 3 and 4. Also, the end of the frame member is held within the crotch. The latch assembly is urged by the compressed spring 74 to the right by virtue of the spring's engagement at one end with the hasp-cooperable means 35 constituting a fixed part of the latch assembly, whereas the bottom plate member 30 is urged to the left by the engagement of the opposite end of the spring with the projection 76 of the plate member. By virtue of this relationship, the latch assembly L may be rotated with respect to the bottom plate member about the fulcrum provided at one end of the assembly, and a separate pivot pin is unnecessary.

Figure 9:
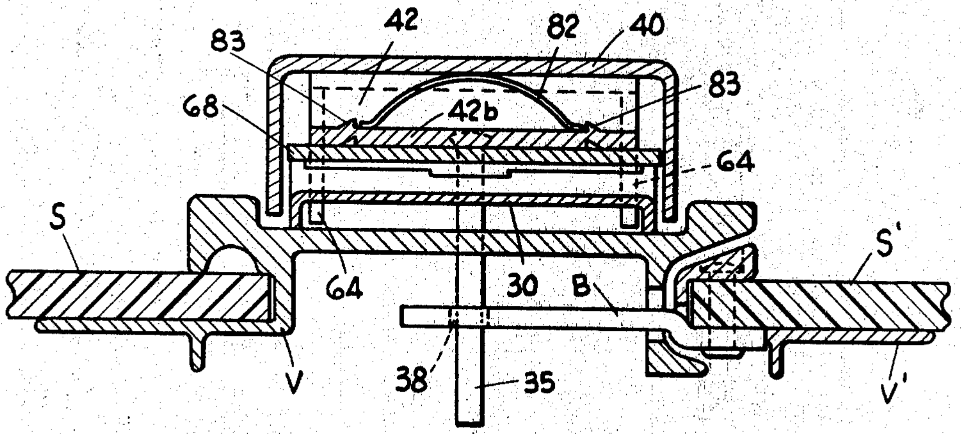
FIG. 9 is a vertical cross-sectional view taken approximately in the plane of 9—9 of FIG. 2.

As shown in FIGS. 2–4, the frame member 68 also serves as a support for the movable plug member 42. The plug member has a portion thereof 42a which slides against the underside of the latch member 40. The plug member also has a portion 42b at a lower level which rides on a surface provided by the frame member. The fingers 60 extend from the portion 42b. A bent leaf spring 82 interposed between the underside of latch member 42 and the portion 42b of the plug member furnishes resilient pressure to releasably maintain the plug member in the positions to which it is moved by the cooperable means 64, 66 of the plug member and of the bottom plate member. As shown in FIG. 9, the portion 42b is provided with transversely spaced projections 83 to confine the ends of the spring. The plug member 42 is resiliently mounted for linear movement in a plane perpendicular to the longitudinal axis of the shaft 50.

Figure 5:
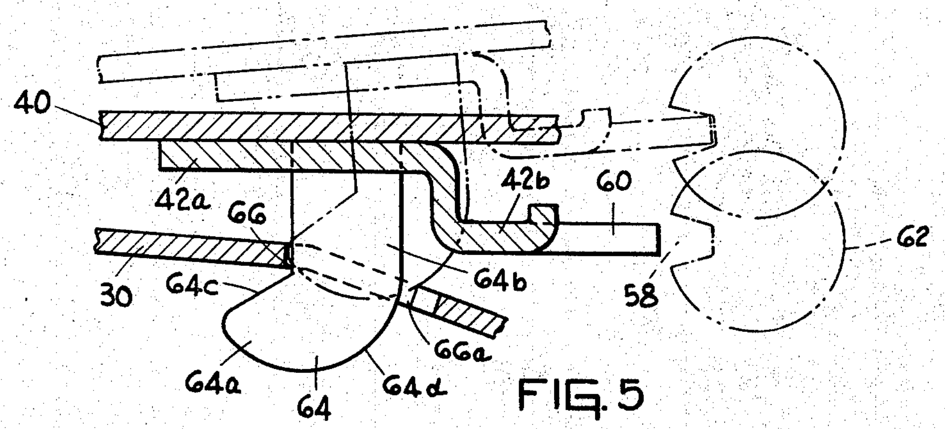
FIG. 5 is a partial schematic view showing means for imparting movement to the plug member element of the latch assembly when the device is "on combination" to permit rotation of the latch assembly to unlatched position and return of the latch assembly to latched position where the dials may be turned to "off combination" to lock the device.

The movement of the plug member 42 is responsive to the movement of the latch assembly and is accomplished by a cam action. As shown in FIG. 5, the means 64, which extends from the underside of the plug member, has an angled hook portion 64a at the end of a straight portion 64b. The angled edge 64c and the opposite edge 64d serve as a cam for cooperation with the edge 66 and 66a provided by the bottom plate member (also see FIG. 10). Preferably, the plug member is formed to provide a pair of the cam members 64, one at each side of the plug member as shown in FIGS. 7 and 8. The cams extend through the opening 36 in the plate member 30 at the recessed areas 36a on opposite sides of the plate member as shown in FIG. 10. Also, as shown in FIGS. 7 and 8, the frame member is provided with openings 69 at its sides to allow the cam means to extend therethrough.

Regarding the dials 54 and the sleeves 56, it is preferred that the parts be made to enable the selection of a combination of one's secret choice. For this purpose, and as shown in FIGS. 11 and 11A, each dial is provided at a side thereof with circumferentially arranged detent-receiving recesses 84, there being one recess in alignment with each number or indicia on the dial's outer circumference. The recesses extend only partially into the side of the dial and are adapted to receive a detent or detents 86 provided by the sleeve 56. The detent and recess arrangement permits a sleeve to be keyed or meshed to an adjoining dial. Each sleeve is provided with a central bore 88 of a diameter slightly greater than the diameter of the shaft 50. As shown in FIGS. 6–8, a spring member 90 is positioned intermediate one side wall 44 of the latch member and the end sleeve of the abutting assembly of sleeves to normally urge the sleeves into meshing engagement with their respective dials. To disengage the sleeves from their respective dials, a cam member 92 is mounted on the end of the shaft 50 opposite the end where the spring 90 is located. An opening 94 (FIG. 6) is provided intermediate the side wall 44 and the frame member 68 to allow the insertion of a shifter 96 when the latch assembly is in the unlatched position of FIG. 3. The shifter, as shown in FIG. 12, has a bifurcated end 97 which permits clearance of the shaft 50 when the shifter is inserted through the opening 94 and pressed against the cam member 92. Pressure in a direction perpendicular to the shaft will cause the sleeves to be moved out of meshing engagement from the dials as shown in FIG. 8, whereupon the dials may be rotated to a combination of one's secret choice. As indicated in FIG. 8, the combination is changed when the device is "on combination," or when the fingers 60 of the plug member are received within the radial slots 58 of the sleeves. When the spring pressure upon the sleeves is released by removal of the shifter, the sleeves are re-engaged with their respective dials for rotation therewith. As a result, a fixed rotating relationship of sleeves and dials is again established based upon the new secret choice setting.

The described arrangement has the advantage of enabling the shifter to be withheld from browsers who would tamper with the lock to change the combination, rotate the dials to "off combination," and then walk away.

The dials are provided with the usual grooves 98 between adjacent numbers or indicia on the outer circumference of each dial. The grooves are adapted to receive means provided by the aforementioned dial-cooperable spring member 78 so that the dials when related to their respective sleeves may be resiliently maintained in selected circumferential position. With three dials each having ten indicia or numbers thereon as illustrated, there are one thousand different possible combinations available. It will be understood that any desired number of dials may be used to furnish the desired number of available combinations.

The described combination lock operates as follows. With the lock "on combination" as shown in FIG. 2, the latch assembly L may be manually rotated toward the position shown in FIG. 3 by grasping the end of the assembly and lifting in the direction of the arrow (FIG. 2). The lifting movement causes disengagement of the hasp-cooperable means 35 from the hasp B. The unlatching action is permitted because when a force is applied to lift or rotate the latch assembly about its fulcrum, the plug member 42 is caused to move forward by the camming action afforded by the engagement of each cam surface **64*c* with each edge 66 as diagrammatically shown in FIG. 5. The forward movement of the plug member is permitted because the fingers 60 may enter the aligned radial slots 58 of the sleeves 56. The entry of the fingers into the slots occurs at the early part of the rotational movement latch assembly, and movement is continued to the uppermost position of the latch assembly shown in FIG. 3. The uppermost position of the latch assembly is reached and stopped when the hook portion 35*a* on the hasp-cooperable means 35 engages the adjoining underside of the plate member 30**. Thus, the movement of the plug member is automatically responsive to the rotation imparted to the latch assembly when the lock is "on combination."

In rotating the latch assembly L in the opposite direction or down toward the plate member 30, the opposite action takes palce in terms of the cooperable means 64, 66. The curved cam surfaces **64*d* of the plug member engage the edges 66*a* of the bottom plate member causing the plug member to be retracted to the solid line showing of FIG. 5. The fingers 60 are withdrawn from the slots 58. Now, the dials 54 may be rotated to "off combination" as shown in FIG. 4, where the fingers are confronted with the solid diameter 62** of a sleeve or sleeves, and the latch assembly is locked against the bottom plate member.

FIGS. 13 through 24 illustrate the invention as applied to a draw bolt type of latching device. Where the elements of this embodiment are the same as the elements of the embodiment of FIGS. 1–12, like reference characters will be used.

Figure 14:
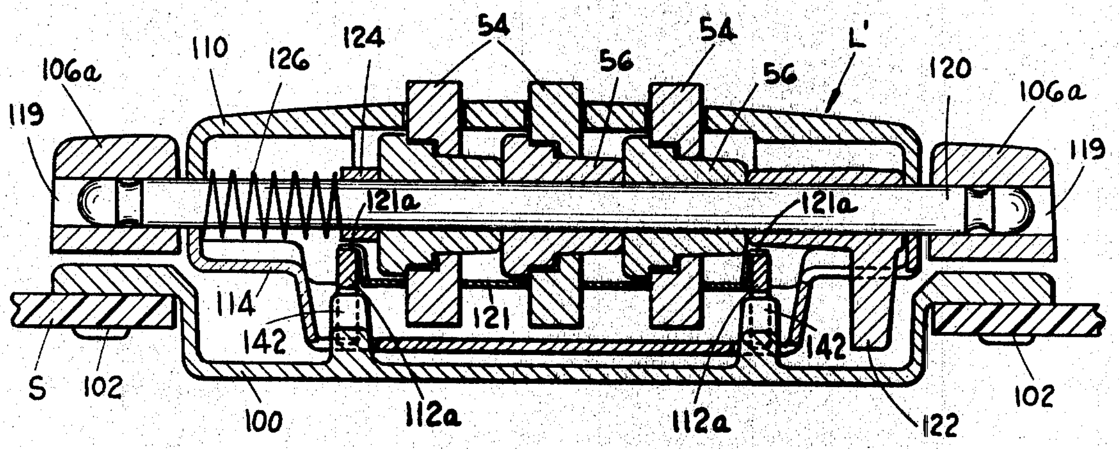
FIG. 14 is a vertical cross-sectional view taken approximately in the plane of line 14—14 of FIG. 13, this view also showing the lock connected to a support.
Figure 15:
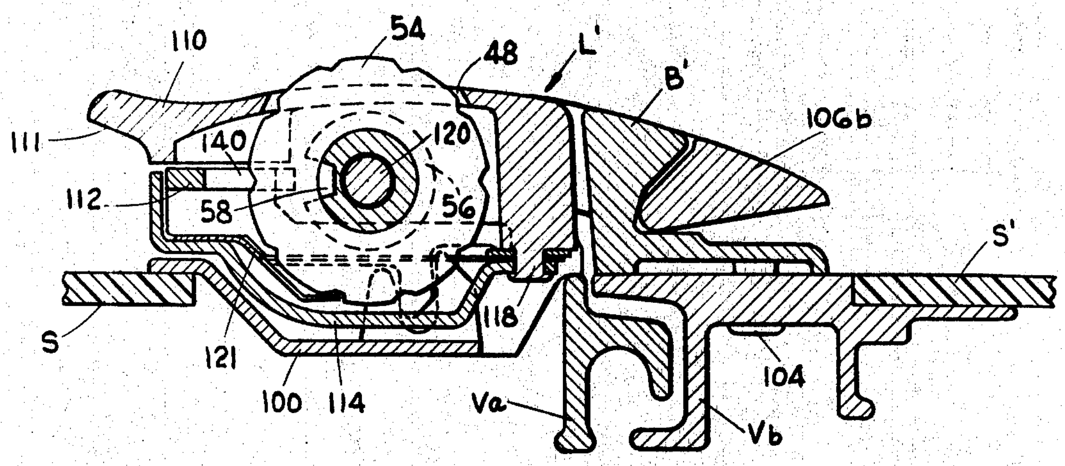
FIG. 15 is a vertical cross-sectional view taken approximately in the plane of line 15—15 of FIG. 13, this view showing the lock in "on combination"
Figures 16, 24:
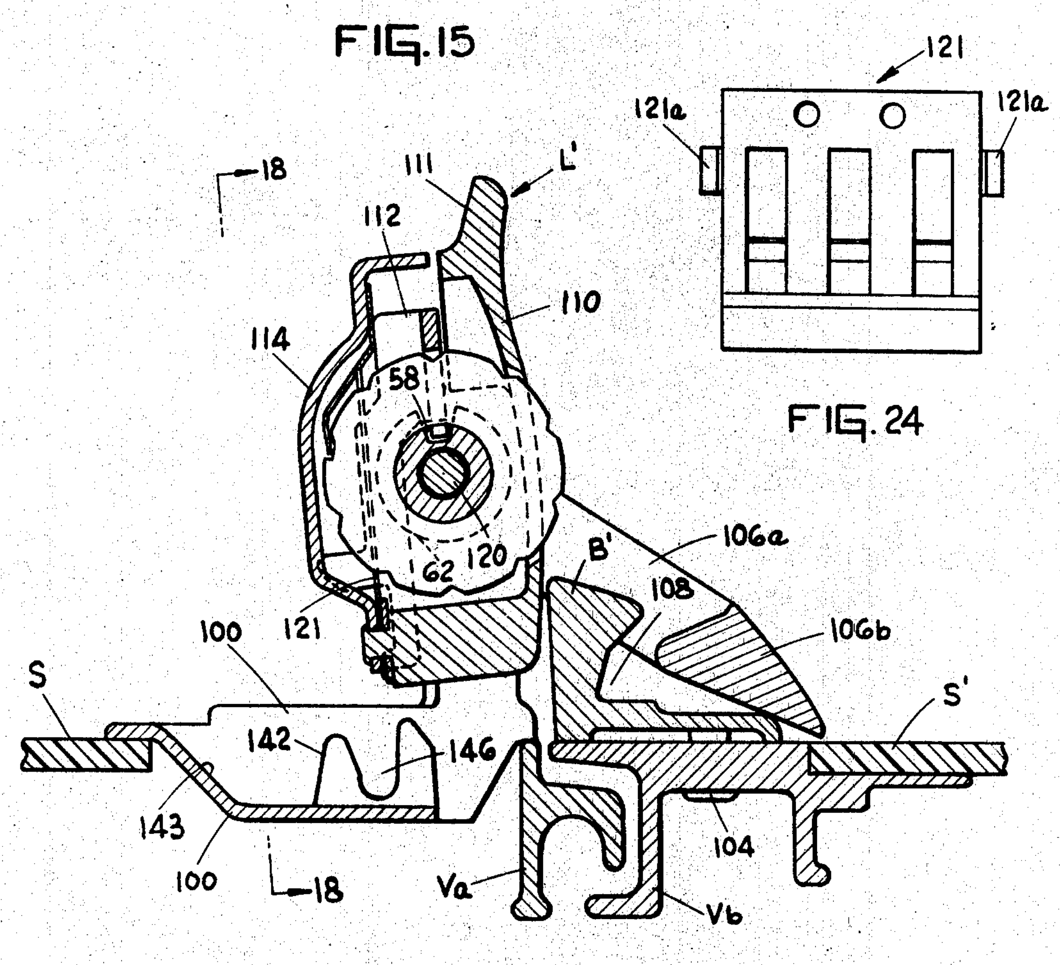
FIG. 16 is a vertical cross-sectional view showing the latching assembly rotated to unlatched position as permitted by the "on combination" of the lock as illustrated in FIG. 15.
FIG. 24 is a top plan view of spring means cooperable both with the dials and the plug member.
Figure 17:
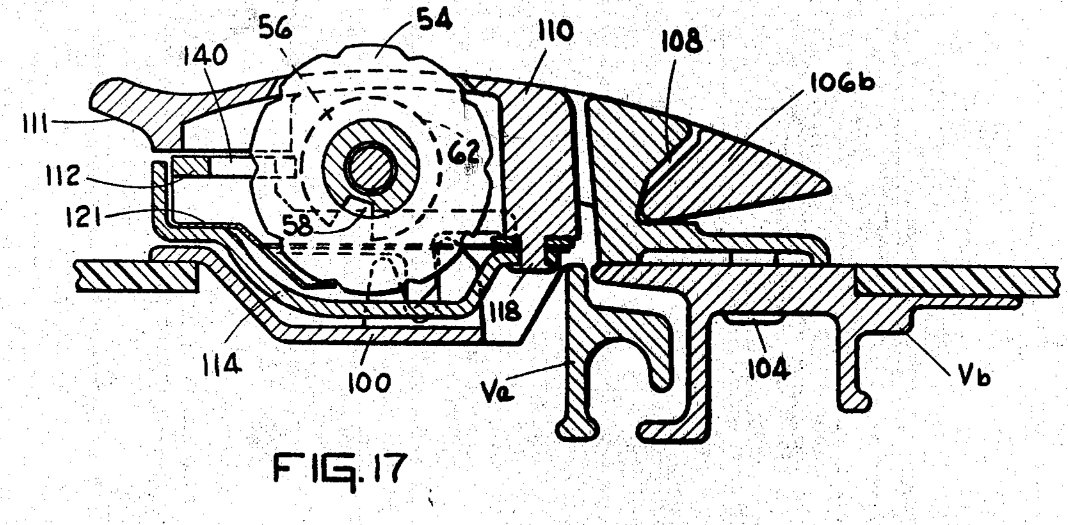
FIG. 17 is a view similar to FIG. 15, except that the lock is "off combination," thereby locking the device.
Figure 18:
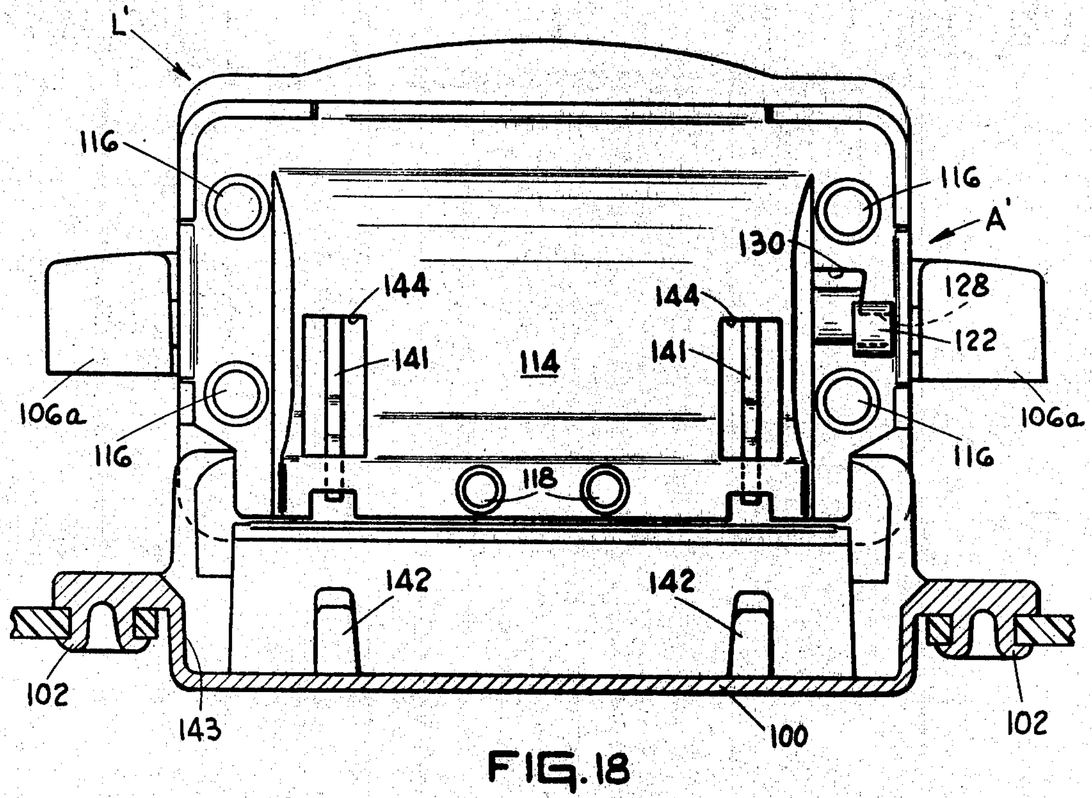
FIG. 18 is a rear view of the lock looking in the direction of the arrows 18—18 of FIG. 16.

The combination lock A′ is cooperable with a hasp B′ and comprises a bottom plate member 100 having means 102 for the connection of the plate member in fixed relation to a support (FIGS. 14 and 18). The combination lock of this embodiment also is shown in conjunction with a luggage case, and it will be understood that other containers, receptacles or the like may be provided with the combination lock of the invention. The bottom plate member preferably is a die cast part and may be provided with the integral, spaced connecting studs 102 as shown, which are extended through openings provided in a luggage case shell S and headed over to form the connection. A valance member V*a* is secured to the peripheral edge of the shell S for cooperation with a valance member V*b* appropriately secured to the peripheral edge of a shell S′. As shown in FIGS. 15, 16 and 17, the hasp B′, also preferably die cast, may be secured to the valance member V*b* by spaced, integral connecting studs 104 extended through openings in the valance member following which the ends of the studs are headed over to form the connection. The structure of the valance members and their relationship to the peripheral edges of the case sections or shells do not constitute a part of the invention.

A latch assembly L′ is pivotally related to the bottom plate member 100. The latch assembly includes hasp-cooperable means in the form of a loop 106 having a generally U-shape. The loop is pivotally mounted in a manner to be subsequently described. The loop possesses spaced arm portions **106*a* and a base portion 106*b*. As is common in the art, the base portion is adapted to be hooked over the hasp B′, the hasp having a longitudinally extending recess 108** for the reception of the loop as shown in FIGS. 15–17 and 19.

Figure 19:
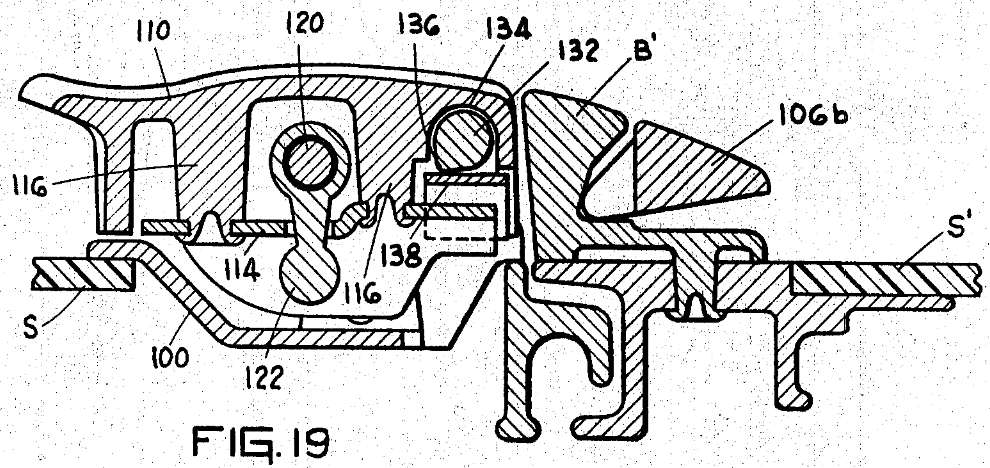
FIG. 19 is a vertical cross-sectional view taken approximately in the plane of line 19—19 of FIG. 13.

The latch assembly L′ also comprises a latch member 110, a plug member 112 and a frame member 114. The latch member and the frame member are connected to one another in a manner to provide a space therebetween to house the plug member, the dials, sleeves and other parts of the locking mechanism. Preferably, the latch member is made as a die cast part and is provided with spaced, integral connecting studs 116 projecting from the underside thereof which are extended through openings provided in the frame member and headed over as shown in FIGS. 18 and 19. The latch member also is provided with spaced integral connecting studs 118 for a purpose to be subsequently described. The latch member is formed to provide a portion 111 for grasping between the fingers for the manual rotation of the latch assembly.

The latch member 110 is provided with a plurality of aligned, spaced openings 48. A shaft 120 is positioned on the underside of the latch member and mounted for movement with the latch assembly. As shown in FIG. 14, the shaft extends outwardly on each side of the latch member, plug member and frame member assembly. The latch member is provided with recess bearings at its sides in which the shaft is laid and held when the frame member is connected to the latch member. The shaft is press-fitted into apertures 119 provided in the loop 106, whereby the shaft also functions as a pivot pin for the rotatable loop. A dial 54 is positioned to partially extend through each opening 48 in the latch member, and respective radially slotted sleeves 56 associated with each dial are mounted on the shaft 120 as previously described. A dial-cooperable spring 121 is provided with spring fingers adapted to be received in the grooves 98 of each dial to prevent unduly free rotation of the dials. The spring 121 is shown in plan in FIG. 24. The spring also is provided with side ear portions **121*a*** for a function to be subsequently described.

In this form of the invention, the means for disengaging the sleeves from the dials to enable changing the combination to a combination of one's own secret choice includes a shift lever 122 (FIGS. 14, 18 and 19). The shift lever is mounted on the shaft 120. The lever is rotatably mounted on the shaft in abutting engagement with an adjacent sleeve. As shown in FIG. 14, at the opposite side of the assembly of abutting sleeves, a washer 124 is positioned on the shaft and engaged by a helical compression spring 126. The opposite end of the spring bears against the inturned wall of the latch member or frame member. The spring acts to normally key the sleeves to their respective dials by the recess-detent arrangement 84, 86 as previously described.

As shown in FIG. 18, the frame member element of the latch assembly is provided with an opening 128 to allow the lever to extend therethrough and to permit the lever to be grasped between the fingers. The opening 128 is in communication with a larger opening 130 to allow the lever to be rotated and releasably held after the lever is moved to push the sleeves out of engagement from their respective dials against the force of the spring 126. Then, the dials may be rotated to a selected combination at the front of the device, and the dials and sleeves re-engaged. The combination can only be changed when the lock is "on combination," and as will be apparent from FIG. 18, the lever 122 is readily accessible on the outside of the case, receptacle, container or the like to which the combination lock is secured.

Figure 22:
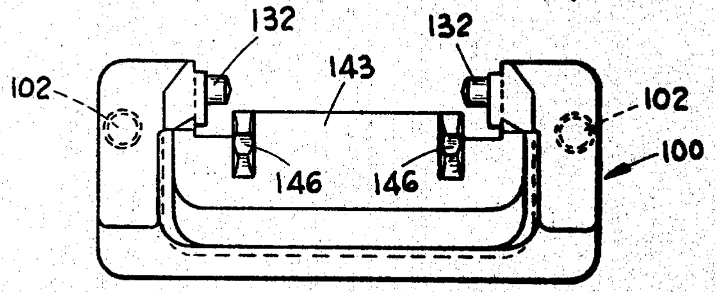
FIG. 22 is a top plan view of the bottom plate member.
Figures 20, 21, 23:
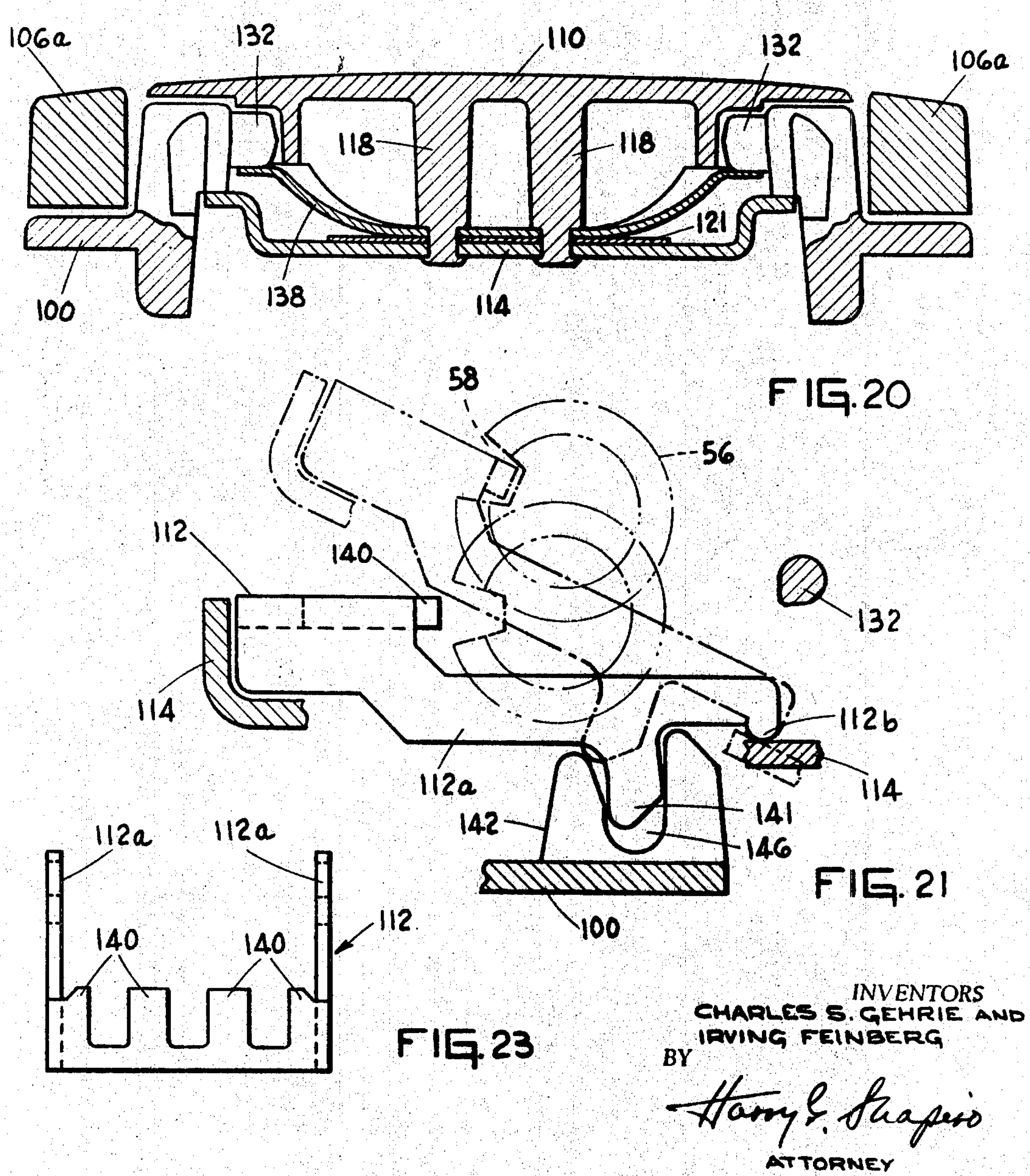
FIG. 20 is a vertical cross-sectional view taken approximately in the plane of line 20—20 of FIG. 13.
FIG. 21 is a partial schematic view illustrating means for imparting movement to the plug member element of the latch assembly to permit rotation of the latch assembly when the device is "on combination"
FIG. 23 is a top plan view of the plug member.

As previously indicated, the latch assembly L' is pivotally related to the bottom plate member 100. The bottom plate member is provided with a pair of inwardly extended trunnions 132 as shown in FIGS. 19, 20 and 22. The trunnions are received in recesses 134 (FIG. 19) formed in the underside of the latch member 110. The trunnions are each formed with a projection 136 for cooperation with the ends of a bent leaf spring 138. This arrangement permits the latch assembly to be resiliently held in the unlatched position of the assembly when the assembly is raised to the position shown in FIGS. 16 and 18. The latch spring 138, also the dial-cooperable spring 121, are secured in position by the aforementioned connecting studs 118 having portions thereof extended through openings in the springs and through aligned openings in the frame member 114 as shown in FIG. 20. These connecting studs therefore fix the location of both the latch spring 138 and the dial-cooperable spring 121. The ends of the studs are headed to connect the parts.

The plug member 112 is confined between the latch member 110 and the frame member 114 and is mounted for linear movement in a plane perpendicular to the longitudinal axis of the shaft 120. As shown in FIGS. 15–17, 21 and 23, the plug member is formed to provide a plurality of spaced fingers 140. The fingers are adapted to be received in the respective radial slots 58 of the sleeves when the fingers and the slots are in alignment as shown in FIGS. 15 and 16. As previously described, the circumferential surface 62 of each sleeve at the area other than the slotted area presents a solid diameter to the fingers of the plug member and acts to block the movement of the plug member when the fingers and slots are out of alignment as shown in FIG. 17.

As more particularly shown in FIG. 23, the plug member 112 is of generally U-shape when viewed in plan and includes the spaced arms **112*a*. The upper sides of the arms are engaged by the ears 121*a* of the spring 121 (FIG. 14) to resiliently maintain the plug member in the position to which it is moved. The forward extremity of each arm is provided with a knob-like bearing portion 112*b* on the underside for engagement with a surface provided by the frame member 114 (FIG. 21). As shown in FIG. 21, a cam 141 is provided to extend from the underside of each arm and constitutes means cooperable with means 142 provided by the plate member 100 for automatically imparting linear movement to the plug member in response to the rotation of the latch assembly L'. Rotation of the latch assembly and linear movement of the plug member are permitted only when the fingers 140 of the plug member are in alignment with the radial slots 58** of the sleeves, or when the device is "on combination" as shown in FIGS. 15 and 16.

As best shown in FIG. 18, the frame member is provided with spaced openings 144 to allow the cams 141 to extend therethrough for cooperation with the means 142 of the plate member. Although the plug member may be provided with a single cam for cooperation with one cam-cooperable means on the plate member, it is preferred that a pair of cams and a pair of cooperable means be used as illustrated. The plate member is formed to provide a recess 143 to receive the underside of the latch assembly.

As best shown in FIGS. 16, 21 and 22, the cam-cooperable means 142 on the plate member 100 are each preferably in the form of a pair of spaced bosses providing an intermediate recess 146. Each recess is dimensioned to receive a cam 141, and the inner sides of each recess are contoured for coaction with the sides of each cam to impart forward and retracting movement to the plug member 112 responsive to the rotation of the latch assembly as previously described. The movement of the plug member and the coaction of the cooperable cam means provided by the plug member and the bottom plate member are diagrammatically shown in FIG. 21. The coaction of the parts and the operation of the combination lock of this embodiment of the invention are essentially the same as previously described with regard to the combination lock illustrated in FIGS. 1–12.

In both forms of the invention illustrated, the dials are locked against rotation in the unlatched position of the latch assembly, thereby minimizing the tampering problem, and the consequent loss of the "on combination."

Also, the construction of the described locks permits ready access to the means for changing the combination on the outside of the case, container, receptacle or the like to which the lock is secured to thereby afford the advantages over the prior art devices wherein the means for changing the combination is located within the container, or the like.

Although, as illustrated and described, it is preferred to provide a mechanism whereby a combination of one's one secret choice may be selected, a number of advantages of the invention may be realized without the inclusion of means for changing the combination. Thus, each dial may be provided with an integral, radially slotted sleeve portion, whereby the "on combination" would be set by the lock manufacturer, and such combination would be supplied on a printed card to the purchaser of the case, container or receptacle having the combination lock assembled therewith.

We claim:

1. A combination lock comprising a plate member for connection in fixed relation to a support, a latch assembly pivotally related to the plate member, the latch assembly comprising means cooperable with a hasp, a latch member and a plug member, the latch member having a plurality of aligned, spaced openings, a shaft on the underside of the latch member mounted for movement therewith, a dial positioned to partially extend through each opening, sleeve means associated with each dial mounted on the shaft, the sleeve means each having a radial slot, the plug member being positioned beneath the latch member and mounted for movement in a plane perpendicular to the longitudinal axis of the shaft, the plug member having spaced fingers adapted to be received in the radial slots when the fingers and slots are in alignment, the sleeve means blocking movement of the plug member when the fingers and slots are out of alignment, and cooperable means provided by the plug member and the plate member for imparting movement to the plug member upon rotation of the latch assembly permitted when the fingers are in alignment with the slots, the latch assembly being locked against the plate member when the fingers of the plug member are out of alignment with the radial slots.

2. A combination lock according to claim 1, wherein the cooperable means provided by the plug member and the plate member comprises a cam extending from the underside of the plug member, and the plate member has cam-cooperable means.

3. A combination lock according to claim 1, wherein the cooperable means provided by the plug member and the plate member comprises a pair of spaced cams extending from the underside of the plug member, and the plate member has a pair of cam-cooperable means.

4. A combination lock according to claim 1, wherein the latch assembly includes a frame member connected to the latch member to enclose the dials, sleeve means and plug member between the latch member and the frame member.

5. A combination lock according to claim 1 including a latch spring to resiliently maintain the latch assembly in unlatched position.

6. A combination lock according to claim 1 including a spring to resiliently maintain the plug member in the position to which it is moved.

7. A combination lock according to claim 1 including a dial-cooperable spring to releasably maintain the dials in the position to which they are rotated.

8. A combination lock according to claim 7, wherein the dial-cooperable means is formed to also resiliently maintain the plug member in the position to which it is moved.

9. A combination lock according to claim 1, wherein the sleeve means are separate sleeves, the dials and sleeves each being provided with cooperable means for keying a sleeve to a respective dial, a spring for normally keying the sleeves to their respective dials, and means for disengaging the sleeves from the dials to permit changing the combination.

10. A combination lock according to claim 9, wherein the means for disengaging the sleeves from the dials is accessible at the underside of the latch assembly when the latch assembly is in unlatched position.

11. A combination lock according to claim 4, wherein the means cooperable with a hasp is secured to the frame member, and the plate member is provided with an opening to allow the passage of the hasp-cooperable means.

12. A combination lock according to claim 4, wherein the means cooperable with a hasp comprises a loop pivotally connected to the latch assembly.

13. A combination lock according to claim 12, wherein the loop is connected to the shaft extended to the sides of the latch assembly.

14. A combination lock according to claim 4, wherein the cooperable means provided by the plug member and the plate member comprises a cam extending from the underside of the plug member and the plate member has a cam-cooperable means, the frame having an opening to allow passage of the cam therethrough.

15. A combination lock according to claim 14, wherein the pivotal relation of the latch assembly to the plate member is provided by a pair of inturned trunnions on the plate member and bearing means provided by the latch member.

16. A combination lock according to claim 15 including a latch spring cooperable with the trunnions to resiliently maintain the latch assembly in unlatched position; and further including a dial-cooperable spring to releasably maintain the dials in the position to which they are rotated.

17. A combination lock according to claim 16, wherein the dial-ccoperable spring is formed to also resiliently maintain the plug member in the position to which it is moved.

18. A combination lock according to claim 17, wherein the latch member is provided with integral connecting studs to secure the latch spring and the dial-cooperable and plug-cooperable spring to the frame member.

19. A combination lock according to claim 18, wherein the means cooperable with a hasp comprises a loop pivotally connected to the latch assembly.

20. A combination lock according to claim 19, wherein the loop is connected to the shaft extended to the sides of the latch assembly.

21. A combination lock according to claim 20, wherein the sleeve means are separate sleeves, the dials and sleeves each being provided with cooperable means for keying a sleeve to a respective dial, a spring for normally keying the sleeves to their respective dials, and means for disengaging the sleeves from the dials to permit changing the combination.

22. A combination lock according to claim 21, wherein the means for disengaging the sleeves from the dials is accessible at the underside of the latch assembly when the latch assembly is in unlatched position.

References Cited

UNITED STATES PATENTS

| | | | |
|---|---|---|---|
| 3,103,115 | 9/1963 | Atkinson | 70—71 |
| 3,405,544 | 10/1968 | Gehrie | 70—74 |
| 3,416,338 | 12/1968 | Gehrie | 70—288X |
| 3,434,314 | 3/1969 | Atkinson | 70—76 |
| 3,439,515 | 4/1969 | Gehrie | 70—288 |

MARVIN A. CHAMPION, Primary Examiner

E. J. McCARTHY, Assistant Examiner

U.S. Cl. X.R.

70—74, 76, 305, 319